United States Patent [19]

Holmen et al.

[11] 3,882,441

[45] May 6, 1975

[54] RESPONSE NEGATIVE MAGNETOSTRICTIVE WIRE FOR AN INTRUDER DETECTOR

[75] Inventors: James O. Holmen; Vahram S. Kardashian, both of Hennepin, Minn.

[73] Assignee: Honeywell, Inc., Minneapolis, Minn.

[22] Filed: Apr. 24, 1974

[21] Appl. No.: 463,488

[52] U.S. Cl. ................ 338/6; 174/126 CP; 310/26; 340/258 R

[51] Int. Cl. ................ G01b 7/16

[58] Field of Search ..... 338/6; 174/126 CP; 310/26; 179/100; 336/20, 177; 340/258 R, 261

[56] References Cited

UNITED STATES PATENTS

| | | | |
|---|---|---|---|
| 1,586,874 | 6/1926 | Buckley | 174/126 CP |
| 1,586,888 | 6/1926 | Elmen | 174/126 CP X |
| 2,490,273 | 12/1949 | Kean | 340/261 |
| 2,854,593 | 9/1958 | Hobraugh | 310/26 |
| 3,723,988 | 3/1973 | Kardashian | 340/258 R |
| 3,774,134 | 11/1973 | Kardashian et al. | 336/20 |
| 3,832,704 | 8/1974 | Kardashian | 174/126 CP |

*Primary Examiner*—C. L. Albritton
*Attorney, Agent, or Firm*—Omund R. Dahle

[57] ABSTRACT

An improved negative magnetostrictive sensing wire for a perimeter security system comprising a strain sensitive line sensor in the form of a magnetostrictive thin film plated wire having uniaxial anisotropy. The plated wire line sensor is preferably buried in a shallow trench or the like and detects intrusion in the vicinity of the line as the line sensor is stressed by the intruder causing a displacement of the earth. A high sensitivity negative magnetostrictive thin film plated wire having good recovery ability and temperature stability for use as a line sensor is one having low $H_k$ values, low $H_k$ dispersion, a thin film plating with a negative magnetostriction coefficient $\eta$ in the range from about −15,000 Oe. to about −30,000 Oe., a plating thickness in the range from about 8000 A to about 20,000 A, and a magnetization skew $\beta$ from about 15° to about 30°.

17 Claims, 12 Drawing Figures

RESPONSE NEGATIVE MAGNETOSTRICTIVE WIRE FOR AN INTRUDER DETECTOR

BACKGROUND OF THE INVENTION

The strain sensitive line sensor consists of a magnetostrictive plated wire having uniaxial anisotropy which acts as a transducer converting displacement of movement of the earth or other media or surface with which the wire is in contact to an electrical signal. It will detect intrusion in the immediate vicinity of the line. In principle, the weight of the intruder, or that of any other moving load on the surface of a semi-infinite solid like the ground, physically disturbs the load supporting medium. The line sensor embedded in or affixed to the medium is stressed by the displacement. The resulting strain on the wire generates a signal.

The term magnetostriction is used to discribe any dimensional change of a material which is associated with its magnetic behavior. Ferromagnetic bodies in particular are susceptible to dimensional changes, for instance, as a result of changes in temperature or a magnetic field. In the following description, the magnetostrictive phenomenon of interest is the converse, where changes in strain in a magnetostrictive material induces a change in its magnetic behavior as has been described in U.S. Pat. No. 3,774,134 issued Nov. 20, 1973, and assigned to the same assignee. The use of a wire having negative magnetostriction as well as one having positive magnetostriction has been generally mentioned in the copending U.S. Pat. application Ser. No. 371,435 filed June 19, 1973, and assigned to the same assignee as the present invention.

Magnetostrictive strain sensitive wires typically comprise a permalloy plating on a conductive substrate wire such as copper-beryllium. A permalloy plating is normally defined as an alloy of nickel and iron. At or about the approximate composition 80% nickel and 20% iron permalloy has a zero magnetostrictive response while an iron rich (Fe more than 20 percent) composition has a positive magnetostriction and a nickel rich (Ni more than 80 percent) composition of plating has a negative magnetostriction. In addition to selecting a positive or negative magnetostriction, the degree of magnetostriction may be selected by controlling the variance of the composition away from the zero magnetostrictive composition.

In line sensor operation, a carrier frequency alternating current, sinusoidal or otherwise, the frequency of which may be in the order of 10 megahertz, is fed into the plated wire transducer which generates an alternating magnetic field in the permalloy plating around the circumference of the wire. The alternating current magnetic field sets the magnetization vector in the plating into oscillation. This, in turn generates an alternating electromotive force in the substrate core of the wire. The voltage output or signal is alternating and constant in amplitude. Changes in the magnetic anisotropy of the film results in changes in the envelope of the signal amplitude. This appears as a modulation of the carrier similar in appearance to an amplitude modulation of a radio wave carrier.

In practice, the magnetostrictive plated wire is generally contained in an insulating flexible tube, such as a teflon tube. The wire and tubing are within a metallic shielded braid which, in turn, is protected by electrical insulation. The current flow through the plated wire may find its return through the metallic shield. The transducer output is detected, filtered through a low pass-band filter, and amplifier to produce an analogue signal.

The output of the transducer wire is a function of magnetic parameters such as the orientation of the magnetization vector relative to the easy axis, anisotropy field ($H_k$) and inductance. In a zero magnetostrictive anisotropic plated wire, the equilibrium orientation of the magnetization vector is determined by the component of the ambient magnetic field parallel to the hard axis of the wire. If the wire plating is also magnetostrictive, the same reorientation of the magnetization vector can also be achieved by straining of the wire.

SUMMARY OF THE INVENTION

In the present invention, a negative magnetostrictive wire having optimum characteristics for use in a line sensor is described. In determining optimum characteristics for a magnetostrictive anisotropic thin film plated wire for use in a line sensor, a number of such wires ranging in magnetostrictive coefficient $\eta$ from +12,000 Oe. to zero to −42,000 Oe. were studied. These wires also varied in $H_k$ (original), in $H_k$ dispersion, in the magnetization skew $\beta$ and in the thickness of the plating deposit. The testing results show that reduced $H_k$, low $H_k$ dispersion and high magnetization skew increase strain sensitivity of the wire very significantly. A proper range of magnetostriction coefficient should also be selected to enhance wire sensitivity. Also to a lesser degree the film thickness has an effect on sensitivity.

DESCRIPTION

Figure 1:
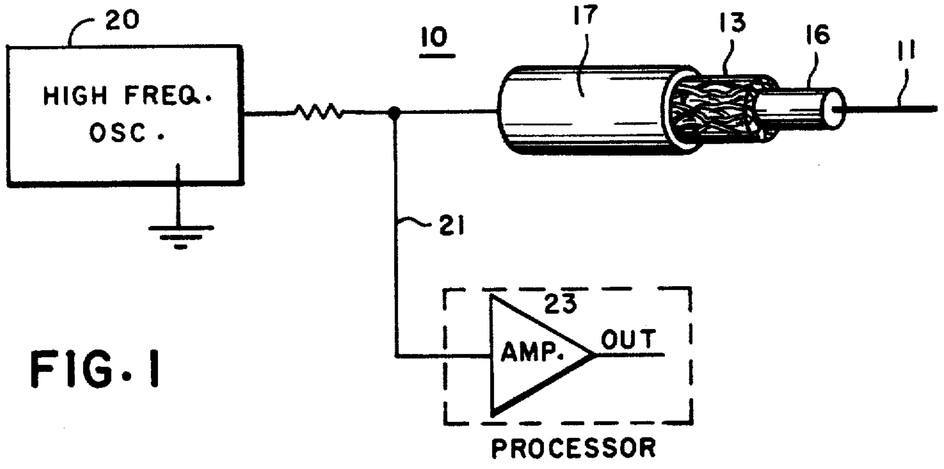
FIG. 1 is a diagrammatic representation of a system utilizing the invention.

Referring now to FIG. 1 of the drawing there is disclosed a cable 10 comprising a magnetostrictive thin film plated wire 11 having an insulating layer 16 within a conductive shield 13, the cable having a protective outer insulation 17, which cable may be intended for shallow burial in the ground for perimeter protection of an area from intruders. A high frequency sine wave oscillator 20 is connected to drive the plated wire 11. The return path for the current may be the metallic shield 13. The output conductor 21 is connected to the input of an amplifier 23 in a processor. The processor also contains a detector, a conventional low pass-band filter and amplifier such that the signal from the amplifier 23 is detected, filtered through the low pass-band filter and amplified to produce an analog signal in the processor.

Figure 1A:
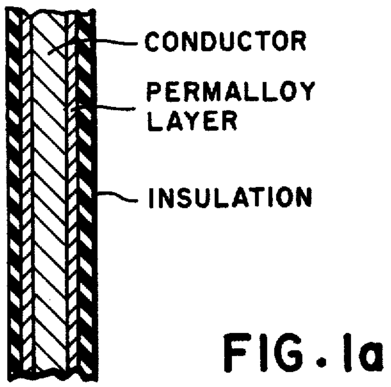
FIG. 1*a* is a longitudinal-section illustration of a short length of plated wire.

The anisotropic plated wire 11 may be, for example, a 10 mil diameter non-magnetic beryllium-copper substrate wire which has been plated with an anisotropic magnetostrictive permalloy (NiFe) film, a longitudinal-section of which is shown in FIG. 1*a*. During deposition of the ferromagnetic film, a magnetic field is applied so that a preferred axis, called the easy axis, is obtained which is oriented circumferentially about the wire or with some other desired degree of skew. An applied circumferential field plus the D.C. plating current flowing in the wire during the film deposition causes a circumferential field in the wire film. In order to skew the field in the film, an external field is applied parallel to the wire during plating. Skew herein is defined as the angular measure by which the easy axis of the the field is displaced from a circumferential direction. The magnetization vector may lie along this line in the absence of external fields and strain on the wire, and makes a loop or helix of magnetic flux around the wire dependent upon the skew angle.

In U.S. Pat. No. 3,657,641 to Kardashian and assigned to the same assignee as the present invention, there is described in more detail anisotropic thin film plated wire of this nature. In that patent the permalloy film is described as being of approximate composition of 80% Ni and 20% Fe, which composition has a low or zero magnetostrictive effect. In the present invention which is a strain detector and which depends on the magnetostrictive response of the wire, it is desirable rather to select the various characteristics of the wire which enhance the magnetostrictive effect. Thus to be discussed below are several characteristics of the wire including those of reduced $H_k$, reduced $H_k$ dispersion, magnetization skew angle $\beta$ on the sensitivity of the wire, the effects of varying the coefficient of magnetostriction $\eta$ (i.e. the tensile strain sensitivity in Oersteds) and the effects of plating thickness.

Figure 2:
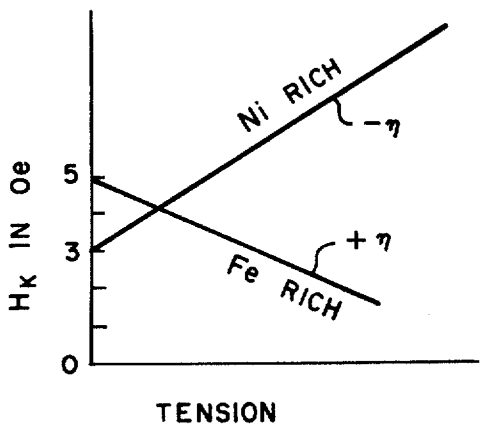
FIG. 2 is a schematic representation of induced $H_k$ to tension for wire of positive and negative magnetostriction.
Figure 3:
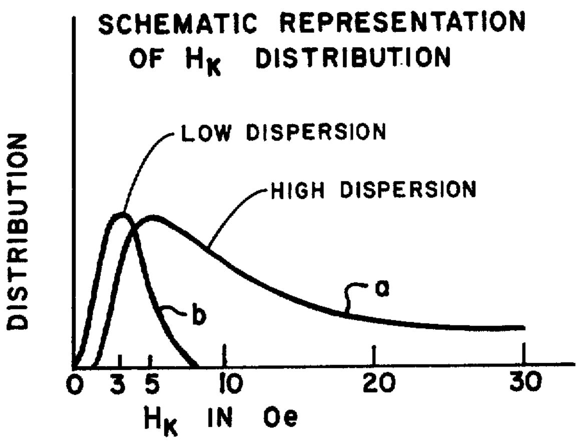
FIG. 3 is a schematic representation of $H_k$ distribution.
Figure 4:
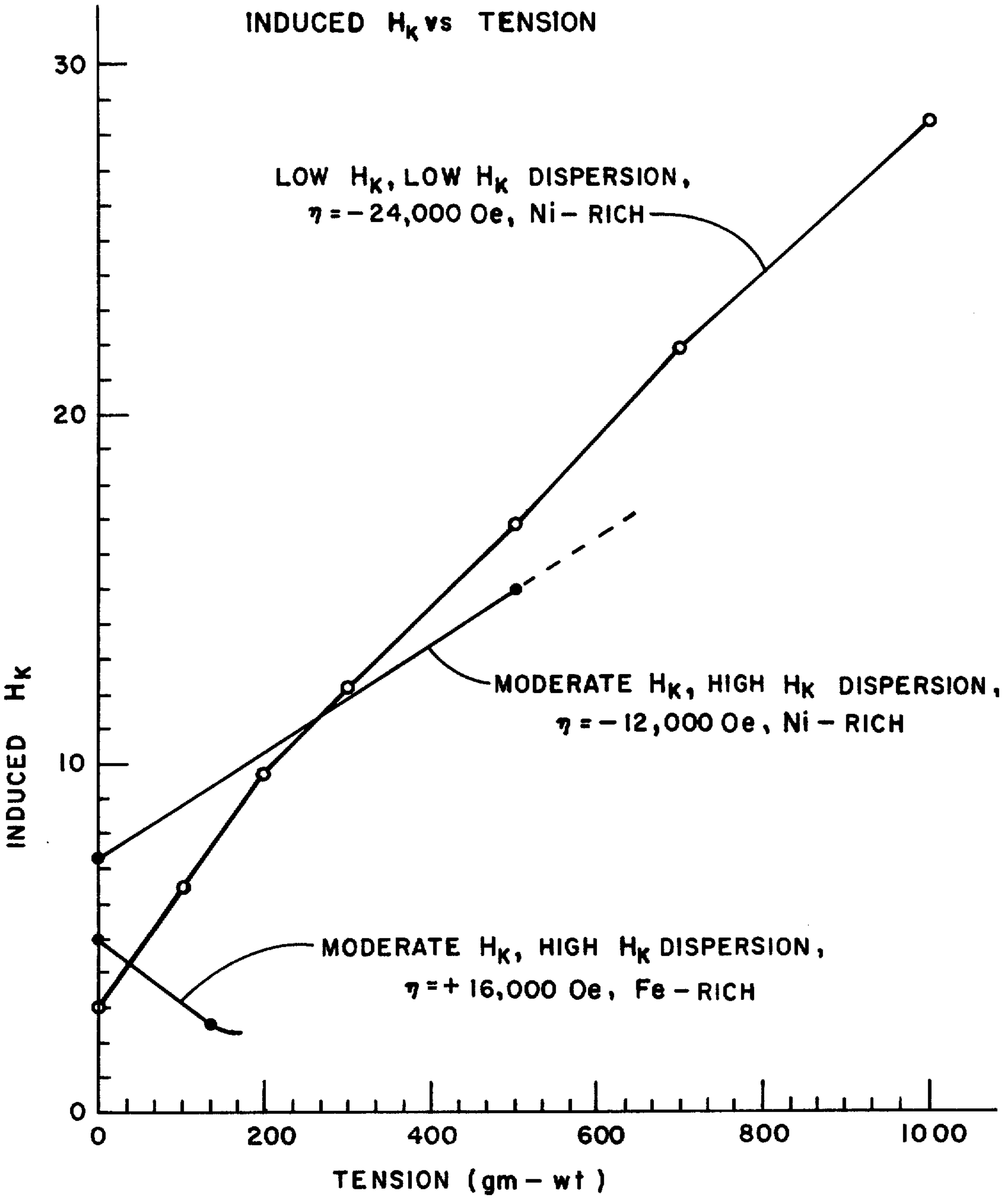
FIG. 4 is a graphical representation of induced $H_k$ vs. tension of wires of different $H_k$ dispersion.

In accordance with the above, FIG. 2 shows schematically the contrasting slopes of $H_k$ vs. tension curves for a nickel rich (i.e. negative magnetostrictive) wire in which $H_k$ (induced) increases with increasing tension and an iron rich (i.e. positive magnetostriction) wire in which $H_k$ (induced) decreases with increasing tension. A schematic representation of the $H_k$ distribution of several wires is shown in FIG. 3; curve *a* showing a wire plating of high $H_k$ dispersion and curve *b* showing a wire plating of low $H_k$ dispersion which is much more suitable for line sensor application. It can be seen that the distribution of $H_k$ in the high dispersion wire has significant components up to 30 Oe. and beyond. The desirable low $H_k$ dispersion wire has an average $H_k$ of about 3 Oe. The $H_k$ distribution curve goes to zero at approximately 8 Oe. The contrast of the induced $H_k$ vs. tension of three specific wires is shown in FIG. 4; the first of the wires is Fe. rich, has a moderate $H_k$ (original) = 5 Oe., a high $H_k$ dispersion and a positive magnetostrictive coefficient $\eta = +16{,}000$; the second of the wires is Ni. rich, has a moderate $H_k$ (original) = 7.3 Oe., a high $H_k$ dispersion and a negative coefficient $\eta = -12{,}000$ Oe.; and the third of the wires is Ni. rich has a low $H_k$ (original) = 3 Oe., a low $H_k$ dispersion and a negative coefficient $\eta = -24{,}000$ Oe.

At this point in the description, a discussion of the basic advantages of a strain sensitive wire for use as a line sensor in which the wire has negative magnetostriction in contrast to a wire having positive magnetostriction is in order. In a strain sensitive wire, the application of tension to one having negative magnetostriction causes its anisotropy field $H_k$ to go up. The anisotropy field $H_k$ is defined (for a single domain homogenous ideal thin anisotropic film) as that field necessary to rotate the magnetization vector of the domain completely to the hard axis direction. The lower values of $H_k$ permit greater oscillatory response of the magnetization vector M to the drive current.

Figure 10:
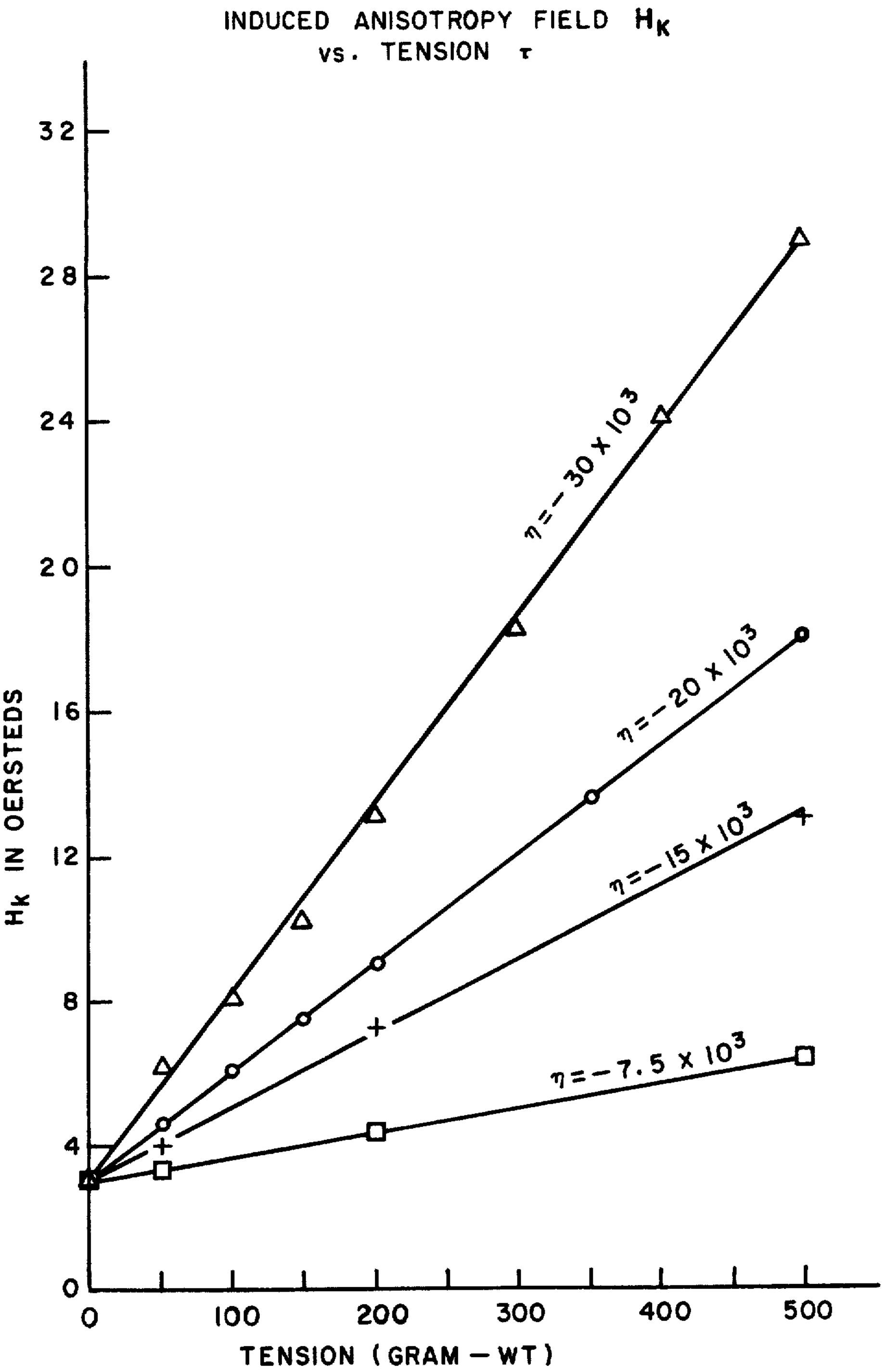
FIG. 10 is a graphical representation showing the change in induced anisotropy field $H_k$ vs. tension.

If we assume for example, a relatively low $H_k$ (original) of 3.0 Oe., as shown in FIG. 10 (curve of $\eta = -15{,}000$), then the application of 100 gm. wt. causes the $H_k$ (induced) to increase to approximately 5.0 Oe. and increasing the tension to 350 gm. wt. causes the $H_k$ to increase to approximately 10.0 Oe. Thus when tensional force is applied to a negative magnetostrictive wire, the $H_k$ goes up and therefore, the oscillations of the magnetization vector become smaller. This is desirable because no demagnetization of the wire occurs due to large strain signals. A strain sensing wire is thereby provided which is most sensitive under low DC loads (low strain) and relatively less sensitive under large DC loads.

Now in contrast, the strain sensitive wire having positive magnetostriction is considered. The application of tension to a wire having positive magnetostriction causes the $H_k$ to go down, which causes the oscillations of the magnetization vector to become larger (i.e. the sensitivity to increase). Because of the way positive magnetostrictive wire reacts to tension there are several disadvantages to its use as an extended length line sensor, in that on the one hand it is desired that $H_k$ (original) be low so that the wire is sensitive under low loads signal levels, and on the other hand, the lowering $H_k$ (induced) as DC strain increases allows the oscillations to increase and if the oscillations reach 90° the wire demagnetizes and becomes inoperable. Since in line sensor operation there is continually applied an alternating exciting current and thus an alternating field, if an increase in tension on the wire causes $H_k$ to drop to a low value (0.5 Oe. for instance) the effect of the earth's field ( 0.5 Oe.) and the exciting field can exceed $H_k$ (induced) and the wire will demagnetize. In most field uses tension is unpredictable, and an uncontrolable factor in the use of the line sensors is the magnitude of the stress signal caused by intrusion in the vicinity of the line. Therefore, there are limitations in the use of a positive magnetostrictive wire, and for a line sensor of extended length a negative magnetostriction wire according to this invention is to be preferred.

Figure 5:
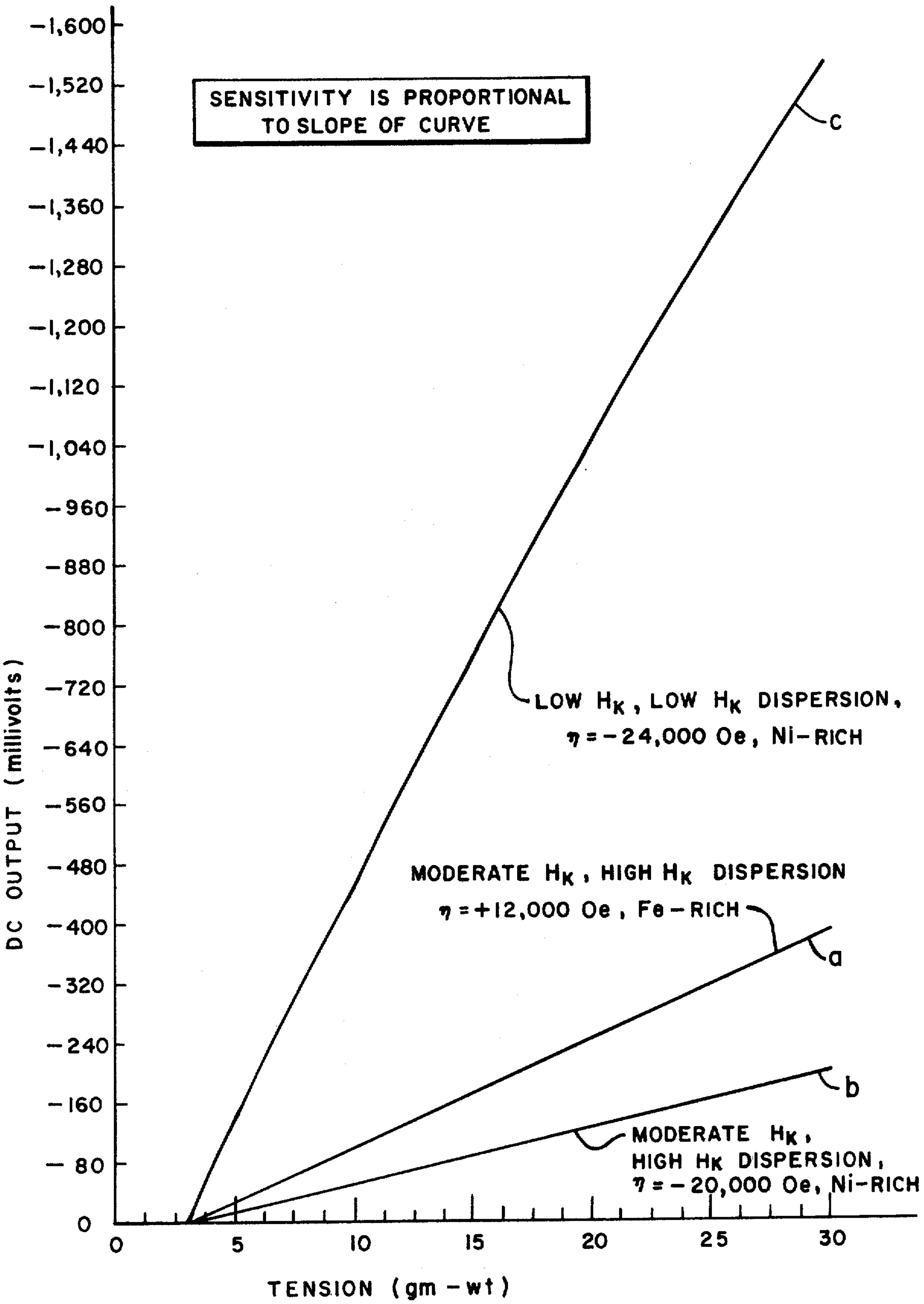
FIG. 5 is a graphical representation of DC output vs. static tension of three wires of differing $H_k$ dispersion and magnetostrictive coefficient; the slopes of the curves are proportional to sensitivities.

FIG. 5 plots the measured DC output (i.e. the rectified carrier voltage) vs. static tension on three specific wires; the first curve *a* showing a wire having an iron rich plating, a moderate $H_k$ (original), a high $H_k$ dispersion, and a positive magnetostrictive coefficient $\eta =$ +12,000 Oe.; the second curve *b* showing a wire having a nickel rich plating, a moderate $H_k$ (original), a high $H_k$ dispersion, and a negative coefficient $\eta = -20,000$ Oe.; and the third curve *c* showing a wire having a nickel rich plating, a low $H_k$ (original) =3.2, a low $H_k$ dispersion, and a negative coefficient $\eta = -24,000$ Oe. It can be seen that the slope of curve c, the low dispersion wire, is about 8 times as great as the high dispersion wire of curve *b*. The signal level which is obtained from these wires is a function of the slope of the DC output as represented in FIG. 5 and thus the selection of a negatively magnetostrictive, low $H_k$, low $H_k$ dispersion wire is seen to be an important factor. Having first made this most important sensitivity improving selection, a further number of wires were made having differences in magnetization skew, differences in magnetostriction and differences in plating thickness and these effects are described below.

Figure 6:
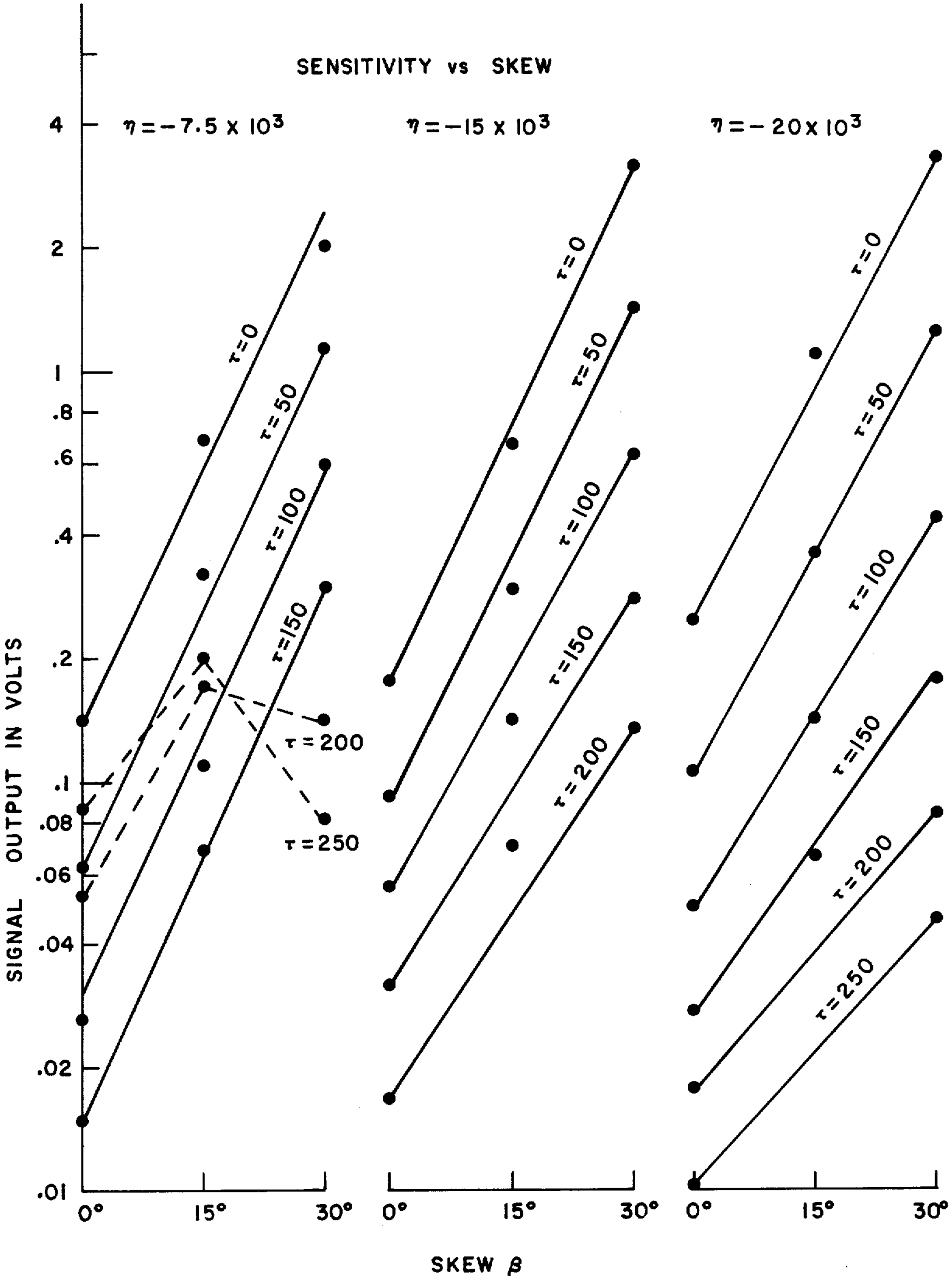
FIG. 6 is a graphical representation of wire sensitivity vs. skew angle of magnetization.

FIG. 6 indicates the effect of magnetization skew $\beta$ on sensitivity of the thin films of varying magnetostriction. Wires having skew angles of 0°, 15° and 30° were prepared and tested. The three columns in FIG. 6 describe families of curves for three negative magnetostrictive coefficients, $\eta = -7,500$ Oe., $\eta = -15,000$ Oe., and $\eta = -20,000$ Oe. The wires are subjected to superposed tensional stresses of a sinusoidal 43 gm. wt. mechanical input signal and a tension mechanical loading from zero gm. wt. to 250 gm. wt. in 50 gm. wt. increments. The electrical response, i.e. the output in volts, of the wire indicates the relative sensitivity, hereafter referred to as "sensitivity." Clearly indicated is the sensitivity as a function of the skew angle under the various tension loads ranging from zero to 250 gm. wt. The effect of skew is unmistakable in generating approximately an order of magnitude increase in sensitivity between wires having a 0° skew and wires having a 30° skew.

The magnetic field which establishes the easy axis field of the thin film plating is applied at the time the wire is being plated. Thus in the case of the wires having a skew of 0°, the field is applied in a direction to cause a circumferential easy axis of magnetization. By properly rotating the applied field at the time of plating, a magnetization skew in the anisotropic film is obtained. Wires included in the testing of this invention had skew angles of 15° and 30°, as well as 0°. As the magnetization vector of an anisotropic permalloy film, in the presence of the hard axis magnetic field, reorients to make an angle with the direction of the easy axis field, so generating a magnetization skew in the anisotropic film also reorients the magnetization vector with respect to the circumferential direction of the wire.

In summarizing the graphs of FIG. 6, it can be stated that increasing magnetization skew causes an enhancement of the sensitivity of negative magnetostrictive wires. Specifically, an increase in skew to 30° causes approximately a tenfold increase in electrical response over that of a wire having a 0° skew. At the present time we have plated and tested wires having skew up to 30°, and based on the slopes of the curves of FIG. 6 we expect the sensitivity to continue to increase for some skew angle increase beyond 30°.

We have observed that nominal zero magnetostrictive plated wire which we prepared and tested, actually possesses an effective but unexpected positive magnetostriction coefficient when subjected to tensional stress. Also the behavior of the films with a relatively low negative magnetostriction coefficient $\eta = -7,500$ Oe. present a dual nature. When subjected to low value of bias tensional stress, the voltage response of the wire to AC stress signals is that of negative magnetostrictive behavior. Under higher bias stresses, the behavior changes to that of a positive magnetostrictive wire. In the left column of curves of FIG. 6 it can be seen that this dual nature of the wire having $\eta = -7,500$ Oe. results in unwanted and unexpected non-uniform curves at DC loads of 200 and 250 gram weights. Thus, the lower coefficient values are not as suitable for a line sensor as are higher values such as −15,000 Oe. and −20,000 Oe.

Figure 7:
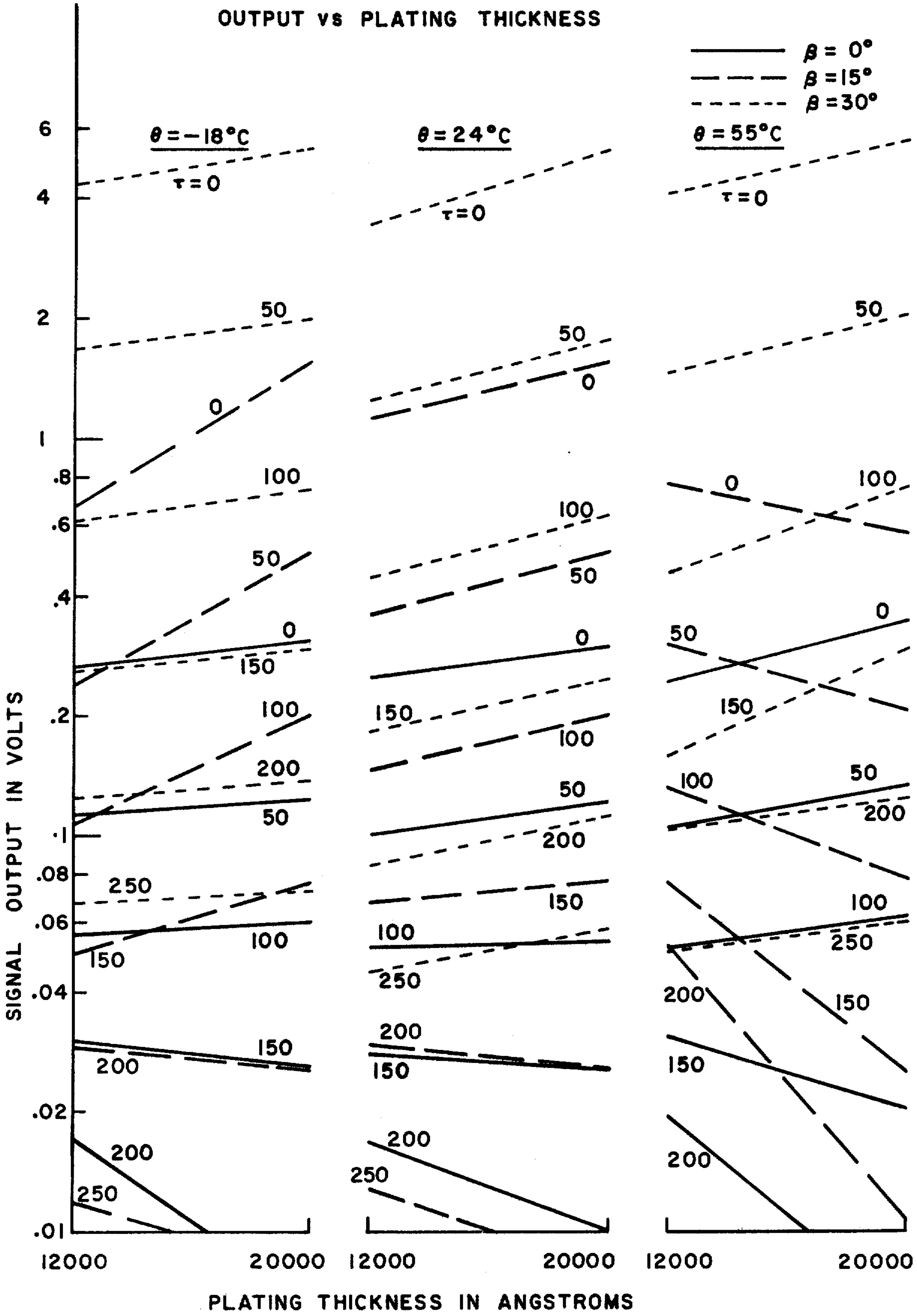
FIG. 7 is a graphical representation of wire sensitivity (output) vs. plating thickness.

FIG. 7 plots the output signal in volts vs. the plating thickness in Angstroms at various temperatures and with several angles of magnetization skew. The range of about 8000 A to about 20,000 A has been found to be suitable for a magnetostrictive line sensor plating and in the comparison of FIG. 7 plating of 12,000 A and 20,000 A thickness are evaluated. These curves are plotted at increasing mechanical loads on the wire beginning at zero and increasing in 50 gm. wt. increments. The negative magnetostriction coefficient of the films measured in FIG. 7 is −20,000 Oe., however, the behavior at −15,000 Oe. is found to be substantially the same and, therefore, is not separately shown. It can be seen from the curves that mechanical loading of the wires causes a reduced sensitivity of the wire to AC tensional stress. The curves show that under low mechanical loads there appears a moderate increase in sensitivity at 20,000 A as compared with 12,000 A, however, at higher bias tensions the sensitivity is very much reduced at 20,000 A, as typified by the curves at bias tensions of 150, 200, and 250 gm. wt. As would be expected from the previous discussions of the effect of magnetization skew, the curves of the wire having a 30° magnetization skew are substantially higher than the others.

Figure 8:
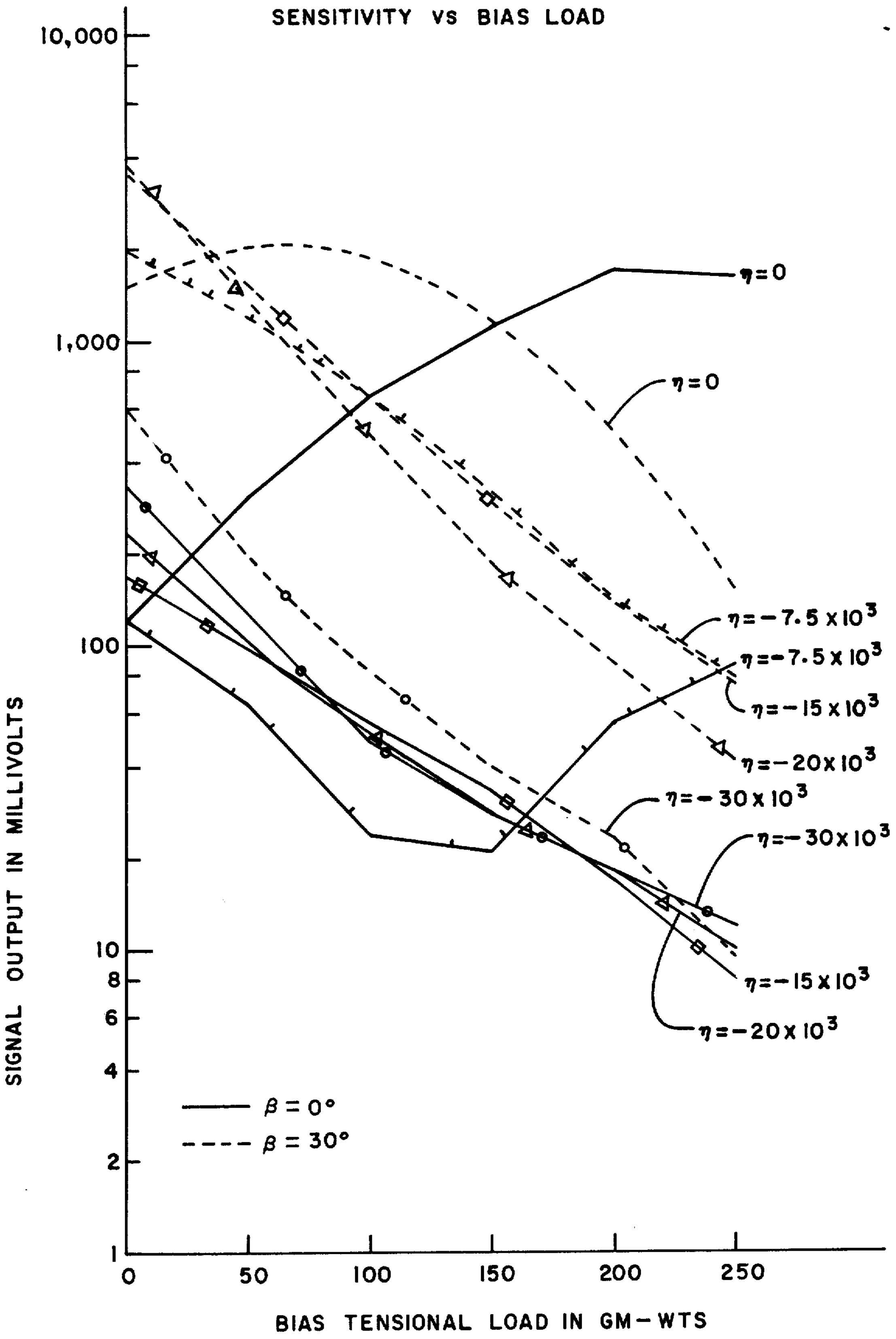
FIG. 8 is a graphical representation of sensitivity vs. wire tensional load for wires having different coefficients and different skew.

FIG. 8 graphically discloses the effect of a mechanical (tensional) load on sensitivity of wires of varying magnetostriction. Anisotropic films of varying degrees of magnetostriction behave in characteristic manners typical of their iron-rich or nickel-rich composition. Two families of curves are grouped together in FIG. 8 to visually illustrate the effect of mechanical loading on sensitivity. The figure shows a first family of curves (solid lines) of varying values of magnetostrictive coefficient ranging from a nominal coefficient of zero up to a coefficient of −30,000, in which the wires have a plating thickness of 12,000 A and all wires posses zero magnetization skew. The measurements were made at 24°C.

A typical difference in behavior between positive and negative magnetostrictive wires is observable under a mechanical tensional load. Negative magnetostrictive wires decrease in sensitivity with increase in loading, whereas the nominal zero magnetostrictive wire has an initial reverse slope which is positive. Although not plotted in FIG. 8, positive magnetostrictive wires demonstrated the same positive slope. Also observable from the family of curves is that the output of wires having coefficient $\eta$ of −15,000 Oe., −20,000 Oe., and −30,000 Oe. closely approach one another. The wire of magnetostrictive coefficient −7,500 Oe. is seen to have a dual behavior; it has a negative magnetostrictive type slope under low tensional loads, and a positive type magnetostrictive behavior at higher tensional loads.

The second family of curves (dash lines) of FIG. 8, represent wires in which the magnetostrictive films possess a magnetization skew of 30°, and it is apparent that the slopes of the curves are generally similar to the 0° skew but exhibit higher output.

Figure 9:
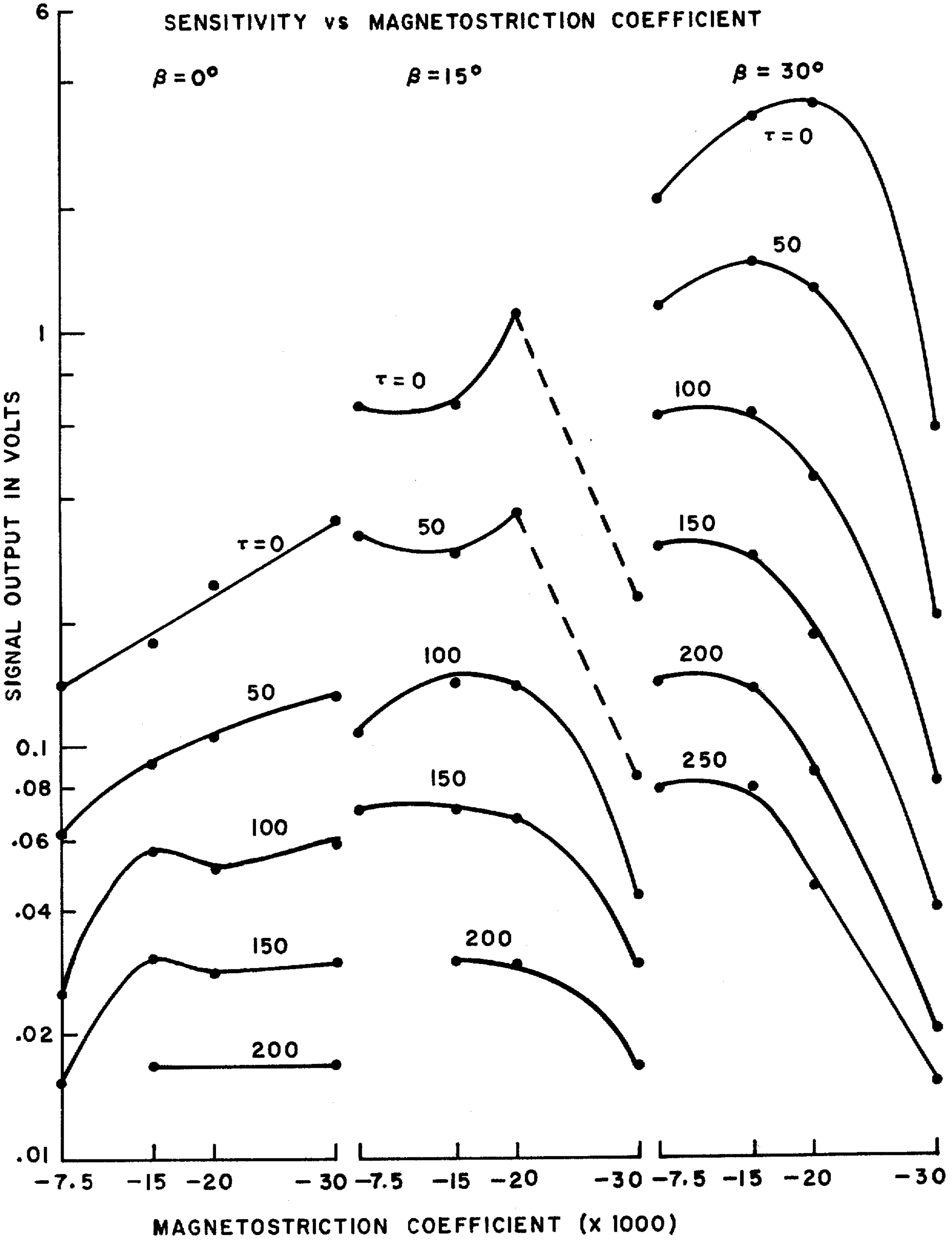
FIG. 9 is a graphical representation of sensitivity vs. magnetostrictive coefficient.

In FIG. 9 there is displayed the effect of varying magnetostrictive coefficient vs. sensitivity. In the section immediately above it appeared that the sensitivity response of magnetostrictive wires which are of a negative magnetostriction coefficient of −15,000 Oe. or more and which possess 0° magnetization skew are substantially alike in sensitivity. In this FIG. 1, the effect of varying magnetostriction coefficient is shown in greater detail for magnetization skews of $\beta = 0°$,$\beta = 15°$, and $\beta = 30°$. For each value of skew angle in FIG. 9, a family of curves describes the relative sensitivity at varying mechanical tensional loads ranging from zero gm. wt. to 250 gm. wt.

In an overall consideration of FIG. 9 it may be noted that among wires characterized by negative coefficients of magnetostriction, the coefficient $\eta$ has a significant effect on the output or sensitivity. The effect, however, is dependent upon the degree of magnetization skew. For values of $\beta$ equals 0°, curves are "near flat" in the magnetostriction range from −15,000 Oe. to −30,000 Oe., where "near flat" is interpreted to mean that the lowest sensitivity measurement in the range differs from the highest sensitivity by less than 50%. For magnetization skews of 15° and 30°, the "near flat" area moves into the magnetostriction range between about −7,500 Oe. and about −20,000 Oe. From a consideration based solely on the data shown on this figure, the selected parameters of a high sensitivity wire are a skew of about 30° and a magnetostriction of about −15,000 Oe.

Reviewing now the various factors which are significant in improving the sensitivity and reliability of a magnetostrictive line sensor, the selection of a wire characterized by negative magnetostriction, low average $H_k$, and low $H_k$ dispersion is of primary importance. Another significant factor is the magnetization skew. FIG. 6 shows that wires having 15° skew are more sensitive than wires having 0° skew and that wires having 30° are more sensitive than wires having 15° skew. The higher skew angles are to be preferred. A further factor is the selection of the proper coefficient of magnetostriction. From FIG. 9, especially from the families of curves representing the higher skew angles 15° and 30°, it is apparent that the range from about $\eta = -15{,}000$ Oersteds of about to = −20,000 Oe. is to be preferred, since the sensitivity drops off sharply at −30,000 Oe. as well as at low values. The fourth factor is plating thickness. A wire chosen for best overall sensitivity is one having a skew of about $\beta = 30°$ and a magnetostrictive coefficient of about $\eta = -15{,}000$ Oe. with a plating thickness of about 12,000 A.

Figure 11:
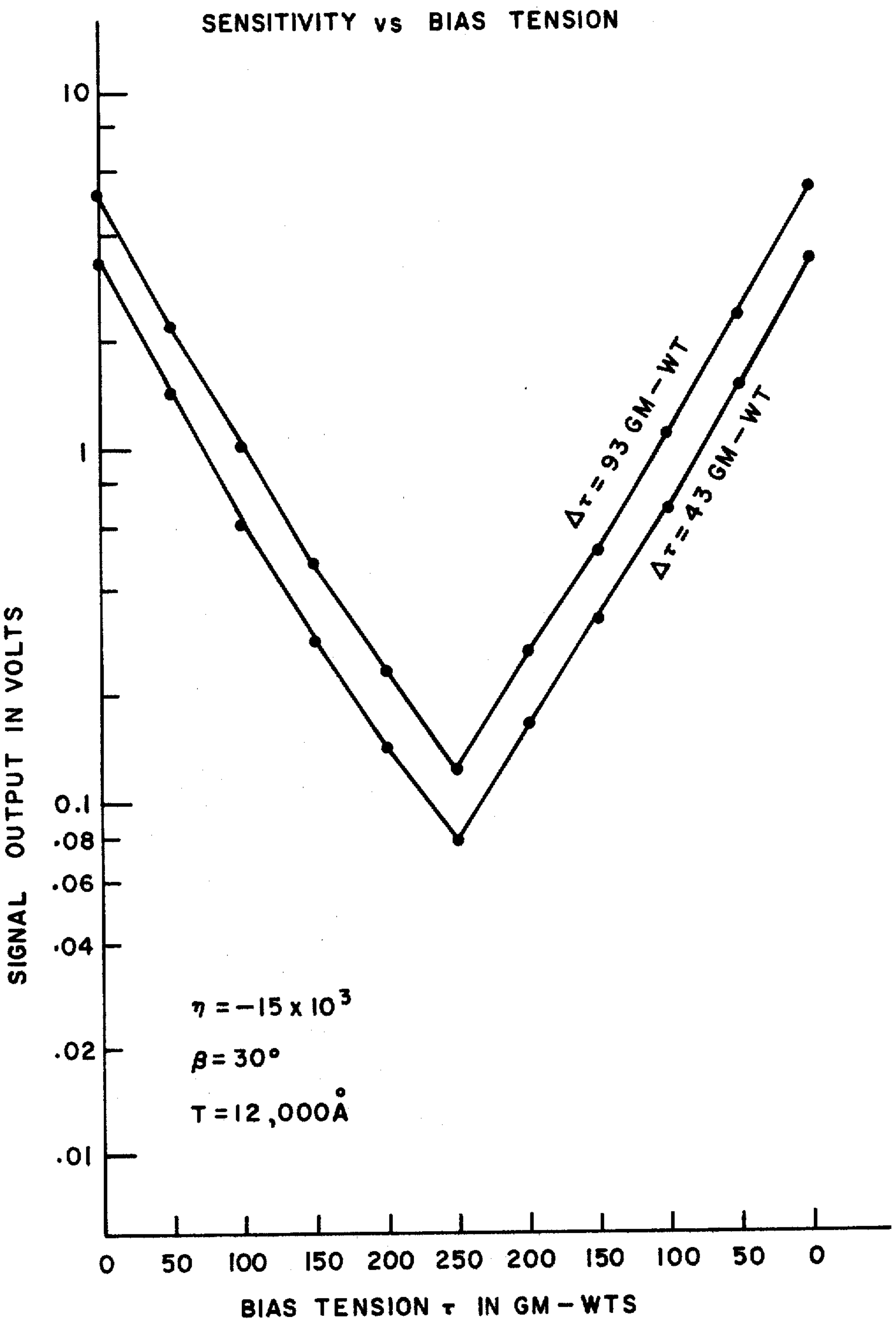
FIG. 11 is a graphical representation of the sensitivity recovery of a wire following the application of a tensional load.

Mechanical load stressing of magnetostrictive wires often changes the sensitivity of the wire to input stress signals. The extent to which the response of the wire is altered is a measure of the stress hysteresis. Therefore, an important characteristic of magnetostrictive wire is its ability to recover its pre-stress sensitivity. FIG. 11 shows response of a magnetostrictive wire which has been subjected to mechanical loads from 0.0 gm. wt. to 250 gm. wt. and down to zero. The film of the wire has a magnetostriction coefficient $\eta = -15{,}000$ Oe., a skew B = 30°, and a film thickness of 12,000 A. It is seen in FIG. 11 that the right side is a near perfect mirror image of the left side, which implies excellent recovery characteristics. Other wires with differing values of B,$\eta$ and thickness tended to have higher hysteresis. This wire was one of the better wires in recovering its prestress sensitivity or in other words, has the least stress hysteresis. This is also the same wire chosen for best overall sensitivity.

Temperature effects on the plated wire were also studied and although the results are not shown here graphically because temperature was a relatively minor factor, it can generally be stated that if one assumes that a temperature independent behavior is a desirable characteristic of magnetostrictive wires in line sensor applications, then a magnetostrictive wire of coefficient $\eta = -15{,}000$ Oe. and skew $\beta = 30°$ represents the best performance. This is the same wire chosen for best overall sensitivity and also as having the least stress hysteresis.

The embodiments of the invention in which an exclusive property or right is claimed are defined as follows:

1. An improved sensitivity plated wire for use in an intrusion detection system which uses as a tranducer an extended length of strain responsive anisotropic negatively magnetostrictive thin film plated wire, the improved wire comprising:
   an extended length of conductive wire substrate,
   a strain responsive anisotropic negatively magnetostrictive thin film deposit on said substrate, said film having a relatively low original average anisotropy field $H_k$ of about 3 Oe., a dispersion in $H_k$ which is low, and a coefficient of magnetostriction in the range from about −15,000 Oe. to about −20,000 Oe.

2. The invention according to claim 1 wherein the upper limit of $H_k$ dispersion is about 10 Oe.

3. The invention according to claim 1 and further comprising:
   said film having an easy axis which is skewed with respect to the circumferential direction.

4. The invention according to claim 3 wherein the skew angle of the easy axis is about 30°.

5. An improved sensitivity plated wire for use in an intrusion detection system which uses as a transducer an extended length of strain responsive anisotropic negatively magnetostrictive thin film plated wire, the improved wire comprising:
   an extended length of conductive wire substrate,
   a strain responsive anisotropic negatively magnetostrictive thin film deposit on said substrate, said film having an easy axis which is skewed with respect to the circumferential direction, the skew angle being at least equal to about 10° whereby the easy axis is aligned in a helical direction around the wire.

6. The invention according to claim 5 in which the skew angle is in the range of about 15° to about 30°.

7. The invention according to claim 6 in which the skew angle is about 30°.

8. The invention according to claim 5 and further comprising:
   said film having a coefficient of magnetostriction in the range from about −15,000 Oersteds to about −20,000 Oersteds.

9. The invention according to claim 8 in which said coefficient of magnetostriction is about −15,000 Oersteds and said skew angle is about 30°.

10. The invention according to claim 9 wherein the thickness of said film is about 12,000 angstroms.

11. The invention according to claim 5 wherein the thickness of said film is about 12,000 angstroms.

12. The invention according to claim 5 and further comprising:

said film having a relatively low original anisotropy field $H_k$ of about 3 Oe. and having a dispersion in $H_k$ which is low.

13. The invention according to claim 12 wherein the upper limit of $H_k$ dispersion is about 10 Oe.

14. An improved sensitivity plated wire for use in an intrusion detection system which uses as a transducer an extended length of strain responsive anisotropic negatively magnetostrictive thin film plated wire, the improved wire comprising:

an extended length of conductive wire substrate, a strain responsive anisotropic negatively magnetostrictive thin film deposit on said substrate, said film having a coefficient of magnetostriction in a range from greater than about −7,500 Oersteds to about −40,000 Oersteds.

15. The invention according to claim 14 in which the coefficient of magnetostriction is in the range from about −15,000 Oersteds to about −20,000 Oersteds.

16. The invention according to claim 14 and further comprising:

said film having an easy axis which is skewed with respect to the circumferential direction.

17. The invention according to claim 14 and further comprising:

said film having a relatively low original anisotropy field $H_k$ of about 3 Oe. and having a dispersion in $H_k$ which is low.

* * * * *